March 29, 1938.    F. J. TOWNSEND    2,112,431

HYDRAULIC WINDOW RELEASING MEANS

Filed Feb. 20, 1937

INVENTOR.
Frank J. Townsend
BY Brown & Jones
ATTORNEYS.

Patented Mar. 29, 1938

2,112,431

UNITED STATES PATENT OFFICE 2,112,431

HYDRAULIC WINDOW RELEASING MEANS

Frank J. Townsend, New York, N. Y.

Application February 20, 1937, Serial No. 126,768

8 Claims. (Cl. 268—26)

This invention relates to window-operating means and more specifically to window mechanisms for automotive vehicles.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Another object of the invention is to provide an automobile with a plurality of windows so mechanically connected that the opening or shutting of one causes at least one other, at any part of the car, to open or shut automatically at the same time; to provide such arrangements, as in the jamb between a front and rear door, that the shutting of a window in the front door causes the window in the rear door to shut.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

Figure 1:
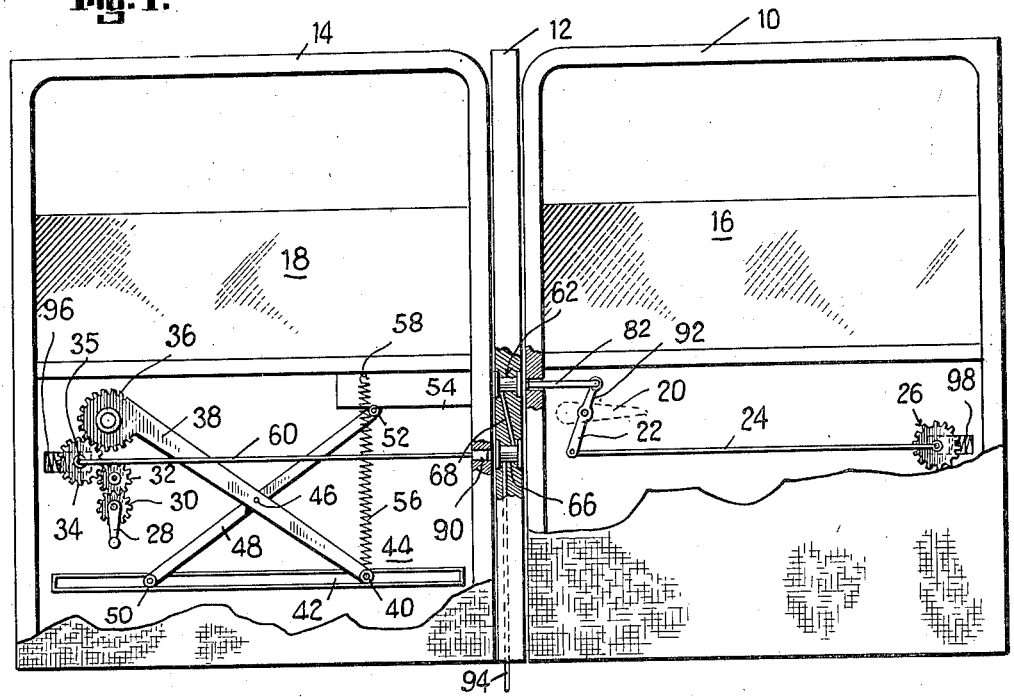
Figure 2:
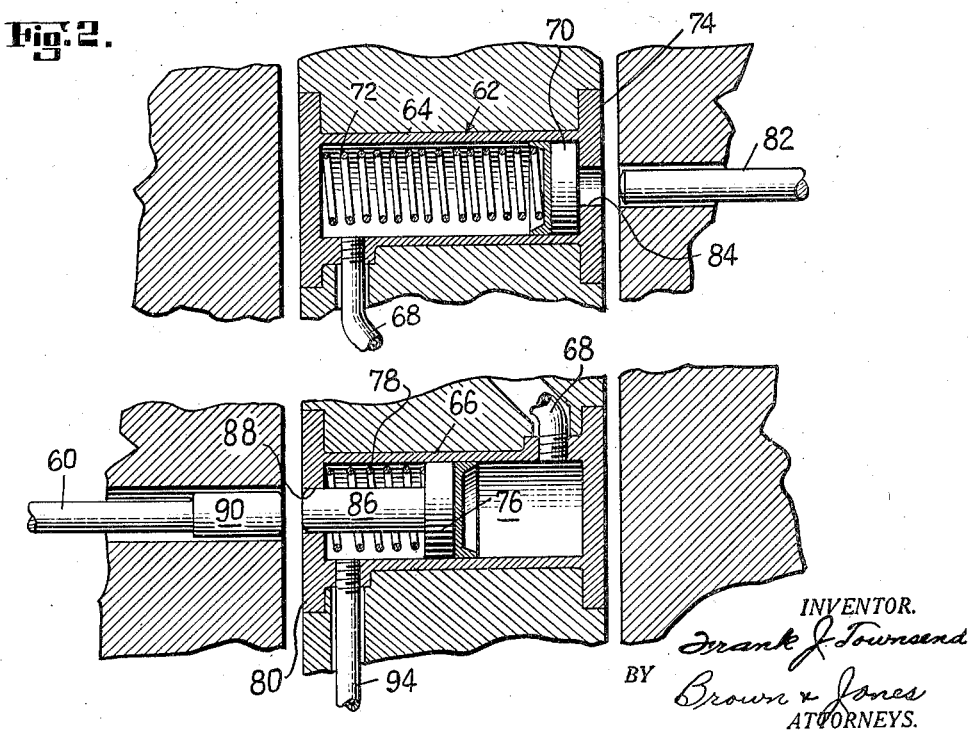

For a fuller understanding of the nature and objects of the invention, reference should be had to the following detailed description, taken in connection with the accompanying drawing, in which:

Fig. 1 is a view in elevation of two doors of an automobile and an intervening jamb, a portion being cut away, embodying one form of the invention; and Fig. 2 is an enlarged vertical view in section of a detail of Fig. 1.

In order to make an automobile secure, it is necessary not only to lock the doors but also to close all of the windows. During warm weather, when it is desirable to lock and unlock a car at frequent intervals, the closing of the windows becomes a tedious affair. The present invention contemplates an automobile so provided with the proper mechanisms that when one of the windows is closed, all of the windows will close.

In the drawing, 10 denotes the door of a vehicle, such as an automobile. This door is separated by an inter-door jamb 12 from another door 14. These doors are provided with movable glass window panes 16 and 18, hereinafter termed "windows". On the outside of door 10, there is a handle 20 which rocks an arm 22 within the door. The arm in turn moves a rod 24 which operates a mechanism shown generally at 26 so as to free the window 16 and permit it, under the action of proper means, to be raised to closed position. Gear 26 is one element of the window-lowering, window-positioning and window-releasing means, all of which may have an action similar to, and be identical with, element 34 and its associated elements, which are to be described hereinafter in connection with window 18. A simple arrangement (not shown) may be provided whereby the closing of the door 10, instead of the turning of handle 20, activates whatever means happen to be used to close window 16.

The action of the element 24 not only permits window 16 to be raised but it also permits another window, such as the window 18, to be raised. Where the raising means are automatic, the operation of the element 24 is the equivalent of raising the windows.

As an example of various control means associated with any window, that shown in connection with door 14 will next be described. A handle 28 on the near face of the door rotates a gear 30 within the door. The latter rotates gear 32 about its fixed shaft. Gear 34 is rotated by gear 32 and in turn rotates gear 36 about its fixed shaft. A relatively long arm 38 integral with gear 36 bears a roller 40 at its end, the roller being positioned in a horizontal slot 42 in a member 44 to which the window 18 is attached. Somewhere along the arm 38, there is pivotally attached as at 46 a rod 48 having a roller 50 at one end of the rod and slidable in slot 42 and having another roller 52 constrained to move horizontally as along the outward casing edge 54. Resilient means such as a spring 56 fixed to the door at 58 tends to draw the window element 44 upward to closed position. When it is desired to open the window, the handle 28 is rotated in such a direction that the end of the arm 38 moves downward. The friction between the various gears is sufficient to hold the window in any lowered position against the action of the spring 56.

The shaft of the gear 34 is not fixed but may be moved by the lever 60 which is attached to the shaft 35 on which gear 34 turns. A sufficient movement of the shaft 35 takes gear 34 out of mesh with gears 32 and 36. With these gears no longer in mesh, there is no friction tending to hold gear 36 and its arm 38 in position. Spring 56, not to be overcome by the gear friction, raises the element 44 and its attached window 18, the roller 40 at the end of arm 38 sliding in the groove 42 and raising the arm 38.

It is very desirable, when rod 24 is operated in connection with some one window, to permit it to be raised, that the various levers 60 or their equivalents connected with the other windows in the car should also operate to permit those other windows to be closed. In those cases where the mechanism is like that associated with window 18, lever 60 must be moved, for example, horizontally, to throw gear 34 out of mesh. A mechanism shown generally at 62 may be used to transmit the action from element 24 to element 60.

The mechanism 62 comprises one or more cylinders 64 and 66 which are connected by means of a conduit 68. They are described in more detail in the co-pending application of David E. Webb. In the simple case where there are but two windows to be operated, one in each of two adjacent doors, the hydraulic system composed of the cylinders and a fluid therein may be located in the jamb between the two doors. In cylinder 64, there is a slidably movable piston 70 held by a spring 72 against the end 74 of the piston, which is flush with the jamb. A similar piston 76 in cylinder 66 is held by spring 78 away from the end 80 of the cylinder 66, which end is flush with the jamb but faces the other door 14. A plug 82 associated with rod 24 in door 10 is axially slidable so as to protrude out of door 10 and, when the latter is closed, through an opening 84 in the cylinder end 74 and push the piston 70 farther into the cylinder 64 against the action of the spring 72. This causes an increase in pressure in the cylinder 64 with the result that the fluid therein moves through conduit 68 into cylinder 66. Piston 76 thereupon slides in cylinder 66 against the action of spring 78. An extension 86 fixed to piston 76 moves therewith through opening 88 in cylinder end 80 and, when door 14 is closed, against the end 90 of the lever 60 so as to move the latter horizontally.

Plug 82 may be pivotally connected to an arm 92 which is rotated by the handle 20 at the same time as the arm 22.

It will be obvious that when the window 16 has been freed to be raised, at the same time, window 18 has been freed to be raised, the latter window through the action of spring 56, the gear 34 having been thrown out of mesh, and the former window by any suitable means which may be similar to the spring and friction-removing means of window 14.

It will be clear that there may be other cylinders similar to 66 associated with other windows and connected to cylinder 66 or 64 through conduit 94.

Through certain mechanically obvious arrangements, it is possible and may be desirable that some one or more windows should be opened, say by a slight amount, when the others are closed. Under certain circumstances, it may be desirable to cause one window to open when another window is opened and to use the force of gravity.

A spring 96 may be provided to move the shaft 35 so that gear 34 meshes with gears 32 and 36. Thus, when handle 20 withdraws plug 82 so that springs 72 and 78 return pistons 70 and 76 to what may be called normal position, it is assured that the gear train in door 14 will be again in mesh and ready for use by the operator to open the window at any time thereafter when it is again desired to open the car. A similar spring 98 may be provided in connection with rod 24.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and useful and desire to secure by Letters Patent is:

1. In a motor vehicle, the combination comprising a plurality of windows, a respective plurality of means adapted for automatically closing said windows, a respective plurality of means for opening said windows, fluid pressure means, means associated with and adapted for disconnecting one of said opening means from operative connection with its respective window and for exerting a predetermined pressure on said pressure means, and means associated with and adapted for disconnecting another of said opening means from operative connection with its respective window and for being set in motion by said pressure of said pressure means.

2. In a motor vehicle, the combination comprising a door, a window in said door, means adapted for shutting said window, means providing a chamber in the jamb of said door, fluid in said chamber, an element associated with said chamber and movable by said first-mentioned means, a second door, a window in said second door, and a second element associated with said chamber and adapted to be put in motion by the motion of said first element through the intervening cooperation of said fluid and adapted, upon being put in motion, to shut the last-mentioned window.

3. In a motor vehicle, the combination comprising a door, a window in said door, means adapted for shutting said window, means providing a chamber in the jamb of said door, an element associated with said chamber and movable by said first-mentioned means, a second window in said vehicle, means providing a second chamber, the interior of said chambers being connected, fluid in said chamber, an element associated with said second chamber and adapted to be put in motion by the motion of said first element through the intervening cooperation of said fluid and adapted, upon being put in motion, to shut said second window.

4. In a motor vehicle, the combination comprising a window, mechanical means adapted for opening said window and for holding said window open, resilient means adapted for closing said window, means for disconnecting said mechanical means from said window whereby said window is thereafter under the control of said resilient means, a second window, mechanical means adapted for opening said second window and for holding said second window open, resilient means adapted for closing said second window, means for disconnecting said mechanical means from said second window, and means operated by the first-mentioned disconnecting means and adapted for operating said last-mentioned disconnecting means and including a fluid pressure transmitting device.

5. In a motor vehicle, the combination comprising a window, frictional means adapted for maintaining said window in a predetermined position, resilient means adapted for bringing said window to a second position, means adapted for disconnecting said frictional means from said window, a second window, frictional means adapted for maintaining said second window in a predetermined position, means adapted for bringing said second window to a second position, means adapted for disconnecting the second-mentioned frictional means from said second window, and fluid pressure means operated by the first-mentioned disconnecting means and adapted for operating said last-mentioned disconnecting means.

6. In a motor vehicle, the combination comprising a window, means for lowering said window, means tending to close said window, frictional means for holding said window open, hand-operated means for releasing said frictional means, a second window, means for lowering said second window, means tending to close said second window, frictional means for holding said second window open, means for releasing said last-mentioned frictional means, and fluid pressure means motivated by said hand-operated means and adapted to motivate the second-mentioned releasing means whereby said closing means for said second window close said second window.

7. In a motor vehicle, the combination comprising a window, means for lowering said window, means tending to close said window, frictional means for holding said window open, hand-operated means for releasing said frictional means, a second window, means for lowering said second window, means tending to close said second window, frictional means for holding said second window open, means for releasing said last-mentioned frictional means, fluid pressure means motivated by said hand-operated means and adapted to motivate the second-mentioned releasing means whereby said closing means for said second window close said second window, and a door containing said first window, said lowering, said closing, said frictional and said releasing means for said first window, and all of said lowering, said closing, said frictional and said releasing means for said first window being operable when said door is open and when not associated with the remainder of the combination.

8. In a motor vehicle, the combination comprising a window, gears for opening said window and so frictionally mounted that the gears and window remain stationary at any one of various positions, hand-operated means for disconnecting said gears from each other, resilient means strong enough and adapted for closing said window when said gears are disconnected from each other, a second window, gears for opening said second window and so frictionally mounted that the last-mentioned gears and window remain stationary at any one of various positions, resilient means strong enough and adapted for closing said second window when the last-mentioned gears are disconnected from each other, means for disconnecting the last-mentioned gears, and fluid pressure means motivated by said hand-operated means and adapted for motivating the last-mentioned disconnecting means whereby the second window is closed when said hand-operated means close said first window.

FRANK J. TOWNSEND.